T. E. Haymond,

Hay Elevator

No. 110,135.   Patented Dec. 13, 1870.

Witnesses    Inventor
             Thomas E. Haymond
             Per Farwell, Ellsworth & Co.
                Attorneys.

United States Patent Office.

THOMAS E. HAYMOND, OF MORRIS, ILLINOIS.

Letters Patent No. 110,135, dated December 13, 1870.

IMPROVEMENT IN HAY-ELEVATORS AND CONVEYERS.

The Schedule referred to in these Letters Patent and making part of the same.

*To all whom it may concern:*

Be it known that I, THOMAS E. HAYMOND, of Morris, in the county of Grundy and State of Illinois, have invented a new and improved Hay-Elevator and Conveyer; and I do hereby declare the following to be a full, clear, and exact description thereof, which will enable others skilled in the art to which my invention appertains to make and use the same, reference being had to the accompanying drawing forming part of this specification, in which—

Figure 1:
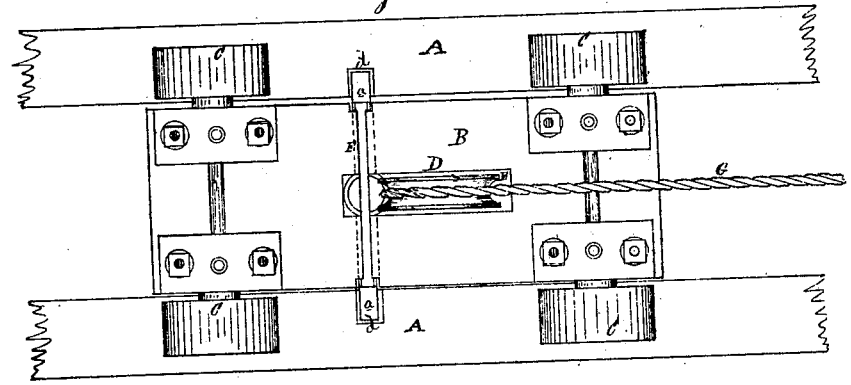
Figure 2:
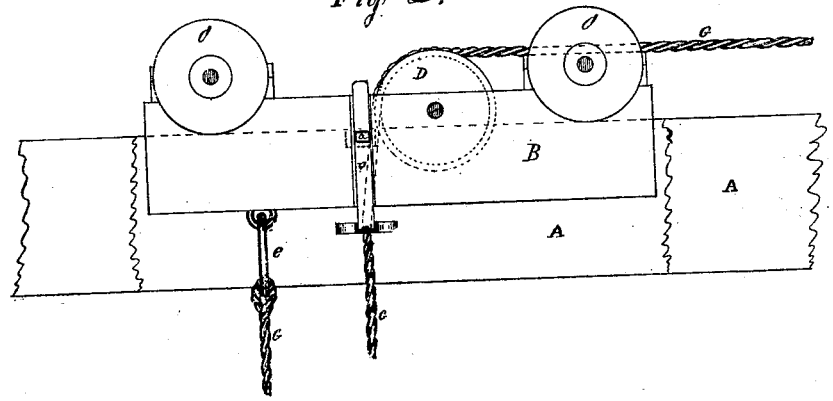

Figure 1 is a top or plan view of my invention, and
Figure 2 is a side elevation of the same.

Similar letters of reference indicate corresponding parts in the several figures of the drawing.

The object of my invention is to provide a device, by the use of which hay may be elevated from a wagon and conveyed to any desired point of delivery; and The nature of my improvement consists in a carriage moving upon an inclined track, suspended from above, the arrangement of said carriage being such as to be moved forward on said track by the action of the rope to which the fork is attached, a description of which will be hereinafter more fully given.

In the accompanying drawing—

A A represent the track, which is suspended from above, and arranged in a manner inclining upward from the center.

B is the carriage, which is provided with wheels C C C C, by which the same moves upon the track.

D is a sheave, which is fixed upon bearings secured to the frame or body of the carriage.

Said wheel revolves within a mortise, E, cut longitudinally in or through the frame.

F is a metal frame, adapted to move within vertical grooves cut in the outer side of the frame or body of the carriage.

Said metal frame has, at or near its center, latches *a a*, projecting horizontally at right angles to the track, and entering notches or slots *d d* cut in the upper and inner sides of the same.

G is the rope to which the fork is attached.

Said rope is secured at one end to a ring, *e*, fixed to the bottom of the carriage, and extends downward to the shank of the fork, in the usual manner; from thence it passes upward through an eye or loop in the lower side of the frame E, to and over sheave D, thence horizontally outward to and over a like sheave fixed to the outside of the barn, thence downward to and around a third sheave secured to the barn at or near the ground.

The operation of my invention is as follows:

The carriage being in the center of the track, the fork is lowered downward, and secured to the hay. Power is then applied to the outer end of rope G, moving the same forward over said sheave, which raises the fork and hay upward, thus bringing the shank of the fork in contact with and against the lower side of the frame F, which disengages the same from notches *d d* in track A A, and carriage B is moved forward upon said track by the action of rope G to the point of delivery. The hay is then disengaged from the fork, and the carriage is moved backward to the center of the track by the trip-cord used in operating the fork.

I have described my invention as being used in barns only, but it may also be used for stacking hay in the field, the proper device for supporting the carriage being supplied.

Having thus described my invention,

What I claim as new, and desire to secure by Letters Patent, is—

The arrangement, with relation to the carriage B and track A of the sliding metal frame F, latches *a*, sheave D, and rope G, as herein described, for the purpose specified.

THOS. E. HAYMOND.

Witnesses:
N. H. SHERBURNE,
G. H. FROST.